(12) United States Patent
Bunsmann et al.

(10) Patent No.: US 7,703,827 B2
(45) Date of Patent: Apr. 27, 2010

(54) MOTOR VEHICLE HATCH WITH A STORABLE REAR WINDOW

(75) Inventors: Winfried Bunsmann, Bissendorf (DE); Olaf Weissmüller, Bramsche (DE); Udo Heselhaus, Ibbenbüren (DE)

(73) Assignee: Wilhelm Karmann GmbH, Osnabrück (DE)

( * ) Notice: Subject to any disclaimer, the term of this patent is extended or adjusted under 35 U.S.C. 154(b) by 0 days.

(21) Appl. No.: 10/574,245

(22) PCT Filed: Sep. 17, 2004

(86) PCT No.: PCT/DE2004/002084

§ 371 (c)(1),
(2), (4) Date: Mar. 13, 2007

(87) PCT Pub. No.: WO2005/039906

PCT Pub. Date: May 6, 2005

(65) Prior Publication Data

US 2007/0262610 A1 Nov. 15, 2007

(30) Foreign Application Priority Data

Sep. 30, 2003 (DE) ................. 103 45 274

(51) Int. Cl.
*B60J 7/00* (2006.01)
(52) U.S. Cl. .................... 296/56; 296/107.07
(58) Field of Classification Search .............. 296/56, 296/76, 107.07, 107.08, 107.17, 107.18, 296/107.2, 108
See application file for complete search history.

(56) References Cited

U.S. PATENT DOCUMENTS

| 4,895,409 | A | * | 1/1990 | Konishi et al. ........... 296/107.2 |
| 5,769,483 | A | * | 6/1998 | Danzl et al. ............ 296/107.08 |
| 6,131,988 | A | * | 10/2000 | Queveau et al. ........ 296/107.17 |
| 6,511,118 | B2 | * | 1/2003 | Liedmeyer et al. ..... 296/107.17 |
| 6,582,009 | B2 | * | 6/2003 | Wezyk et al. ............ 296/180.1 |
| 6,783,170 | B1 | * | 8/2004 | Van Den Acker et al. ..................... 296/146.16 |
| 6,843,523 | B2 | * | 1/2005 | Nania .................... 296/136.05 |
| 2002/0135200 | A1 | * | 9/2002 | De Gaillard ........... 296/107.01 |
| 2002/0158485 | A1 | * | 10/2002 | Obendiek .............. 296/107.07 |
| 2005/0104411 | A1 | * | 5/2005 | Yoshida et al. ......... 296/107.17 |
| 2006/0255619 | A1 | * | 11/2006 | Dickie et al. ........... 296/107.08 |
| 2007/0187984 | A1 | * | 8/2007 | Brockhoff .................. 296/108 |
| 2007/0187985 | A1 | * | 8/2007 | Mori ......................... 296/108 |
| 2007/0210610 | A1 | * | 9/2007 | Bunsmann et al. ..... 296/107.18 |

FOREIGN PATENT DOCUMENTS

| DE | 38 43 674 | 6/1990 |
| DE | 296 22 436 | 2/1998 |
| DE | 298 04 387 | 7/1999 |
| FR | 2 806 969 | 10/2001 |
| WO | 01/14158 | 3/2001 |

* cited by examiner

*Primary Examiner*—Jason S Morrow
(74) *Attorney, Agent, or Firm*—Friedrich Kueffner

(57) ABSTRACT

The invention relates to a motor vehicle (1) having a hatchback (h1) that is movable in at least one position of a rear window (H4), wherein the rear window (H4) can be separately moved from its closed position in the areas (H2, H3) surrounding the hatchback (H1) and opposite thereto into a release position, wherein the rear window (H4) can be stored in an area in the vehicle body (6) that is spaced from the hatchback (H1).

11 Claims, 23 Drawing Sheets

MOTOR VEHICLE HATCH WITH A STORABLE REAR WINDOW

BACKGROUND OF THE INVENTION

1. Field of the Invention

The invention concerns a motor vehicle with a hatch that includes a rear window, wherein the rear window can be moved separately into a released position.

2. Description of the Related Art

DE 296 22 436 U1 discloses a motor vehicle that has a hatch with a rear window, which, to improve the open-air feeling for the occupants of the vehicle, can be moved downward into a lower region of the hatch and thus opens the space that it occupies in its closed position. This type of displacement of the rear window is possible only if the lower region of the hatch has a sufficiently bend-free height for receiving the window, which is usually possible only for vehicles with vertical hatches or vehicles with oblique hatches that extend a very long distance downward.

The objective of the invention is to expand the design possibilities for designers in vehicles of the aforementioned type.

The invention achieves independence of the design of the region of the hatch situated below the rear window from the requirement that a space for housing the opened rear window be made available. Therefore, the lower region can be designed, for example, as a relatively narrow sector or as a region with multiple bends and can have a vertical extent that is considerably smaller than the vertical extent of the rear window.

In this regard, if the closed position and the released position of the rear window and its displacement can be brought about with vehicle-side support of the rear window, the operation is greatly simplified; in addition, in this case there is no danger that a user operating a completely released window can damage it.

If the rear window can be lowered with the hatch in the open position, cost-effective manual operation can be simplified, for example, by virtue of the fact that the open hatch is acted on from the side that is on the inside when the hatch is closed. In this regard, lowering kinematics for conveying the rear window into its released position are possible, which only slightly touches the luggage compartment situated below, even during the lowering movement.

In particular, it is advantageous, to preserve the luggage space, if the rear window is held almost vertically in the released position, say, behind the backrests of a rear seat.

With an essentially U-shaped design of the hatch outside the rear window, when the window is in the released position, the hatch can form a large, opening that extends continuously towards the front without interruption by a transverse support. The open-air feeling is especially pronounced in this case. In particular, the open-air feeling is improved if, in the closed position of the rear window, its upper and front edge (with respect to the direction of travel of the vehicle) is followed by at least one additional panel section that can be moved for opening.

Further advantages and features of the invention are apparent from the specific embodiments of the object of the invention that are schematically illustrated in the drawings and described below.

Figure 1:
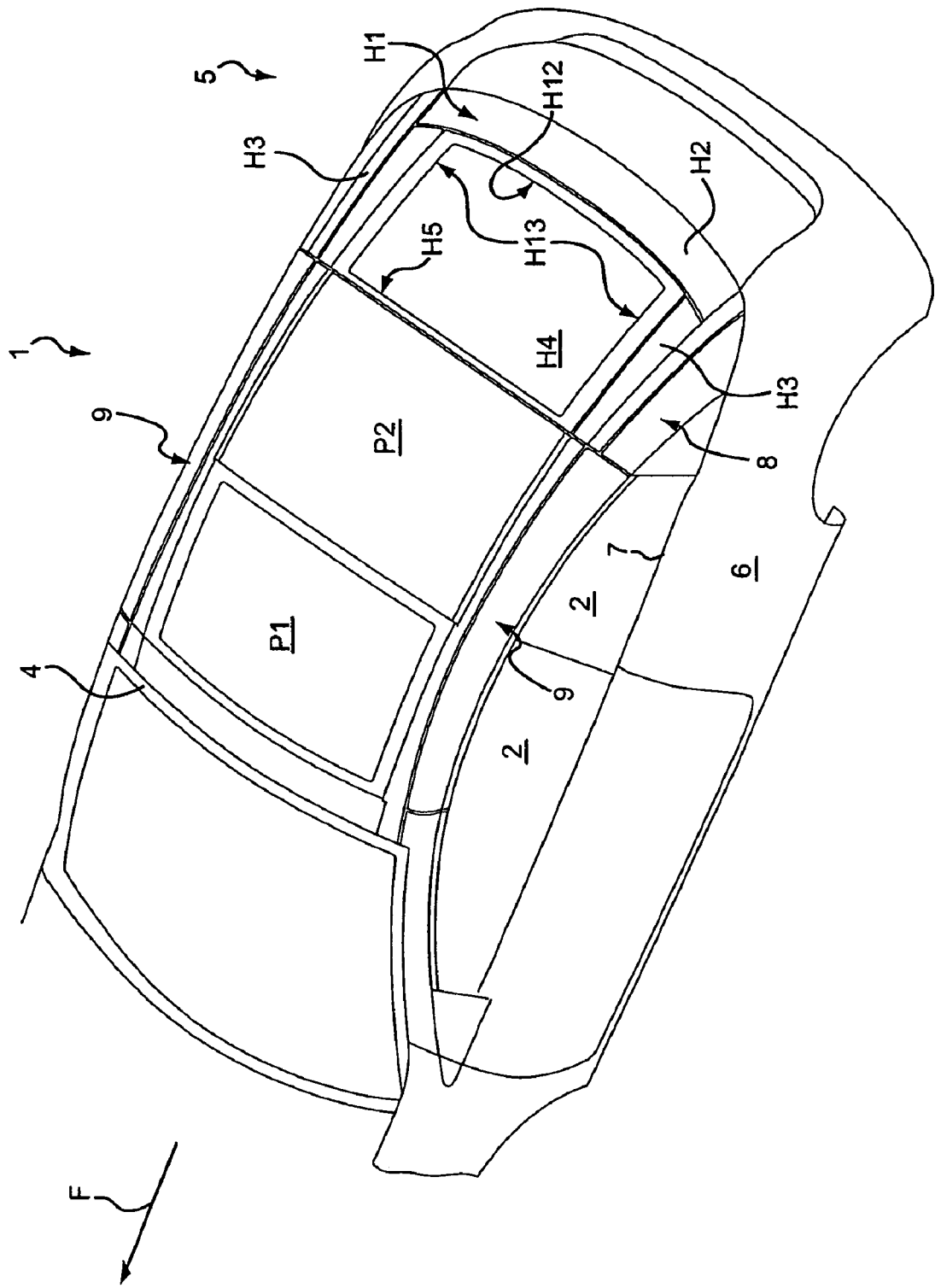
FIG. 1 shows an oblique rear perspective view of a motor vehicle of the invention with a closed rear window and a hatch in the closed position and with two other movable panel sections in front of the upper and front edge of the hatch (with respect to the direction of travel of the vehicle).

The drawings generally show a four-seat or five-seat motor vehicle 1 with a rear seat. However, this is not required. For example, a two-seat motor vehicle can also be designed in accordance with the invention.

The vehicle 1 has side windows 2 that are bounded above by intrinsically rigid roof rails 3, which, as viewed from above, run essentially lengthwise in the longitudinal direction of the vehicle between a windshield frame 4 and the rear section 5 of the vehicle, and which have a curved shape as viewed from the side. These roof rails are part of the automobile body 6.

The rear section 5 has a hatch H1. The hatch H1 has an essentially U-shaped design here with a lower crosspiece H2, which can contain, for example, parts of the taillights and/or a license plate mount, and with side pieces H3, which, in the closed position of the hatch H1, are directed forward and upward in the direction of vehicle travel F and follow the curve of the roof rails 3. An especially rigid rear window H4, which can consist, for example, of plastic or, advantageously, glass, is held between the parts H2 and H3 in its closed position. In this position, the side pieces H3 thus serve as lateral frame parts of the rear window H4. The upper and forward edge H5 of the rear window H4 in the direction of vehicle travel F simultaneously forms the upper and forward edge of the hatch H1 and is not supported from below by a transverse support due to the U-shape of the hatch H1.

Figure 3:
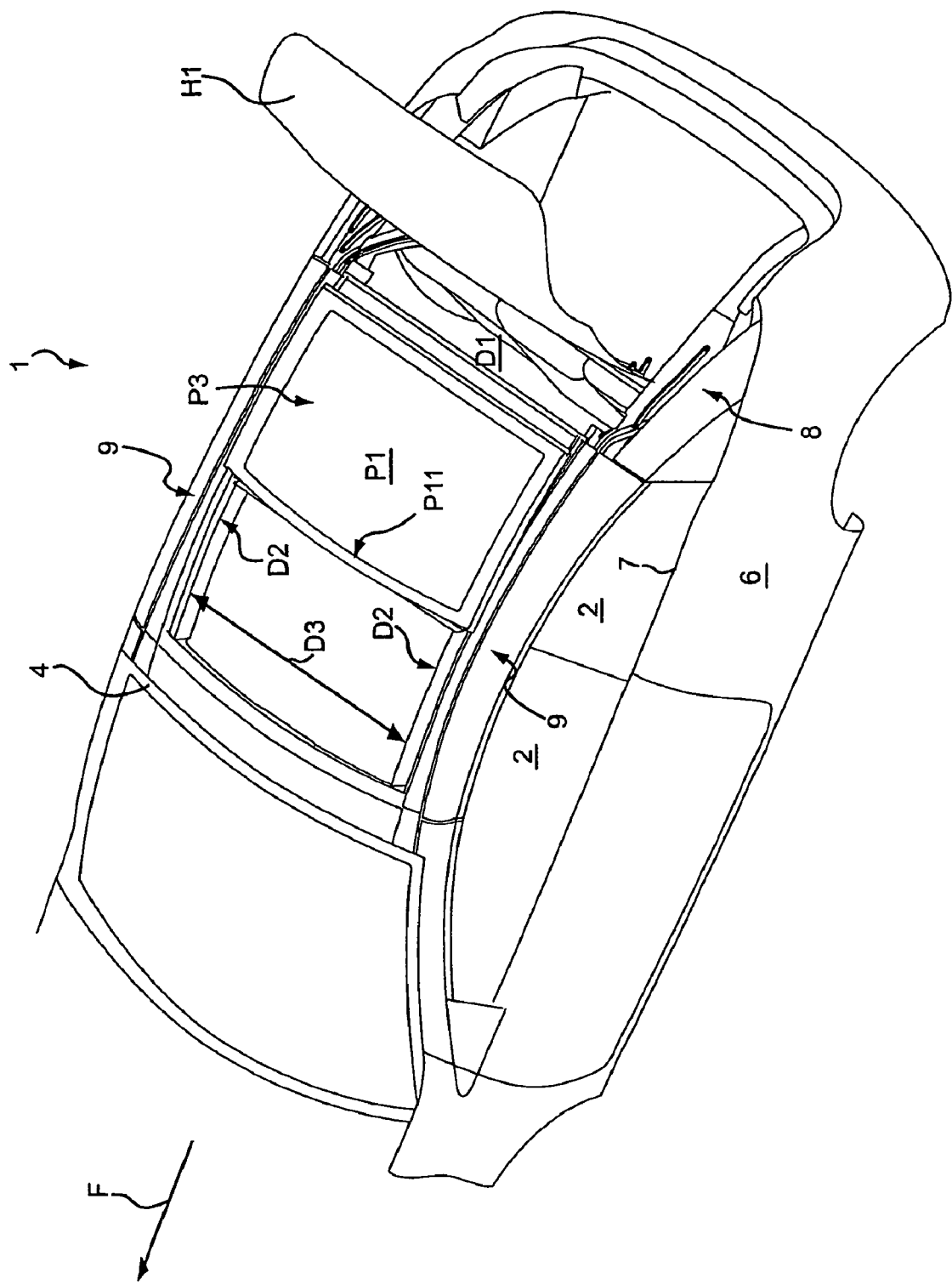
FIG. 3 shows a view similar to that of FIG. 2 with the hatch in the open position.
Figure 4:
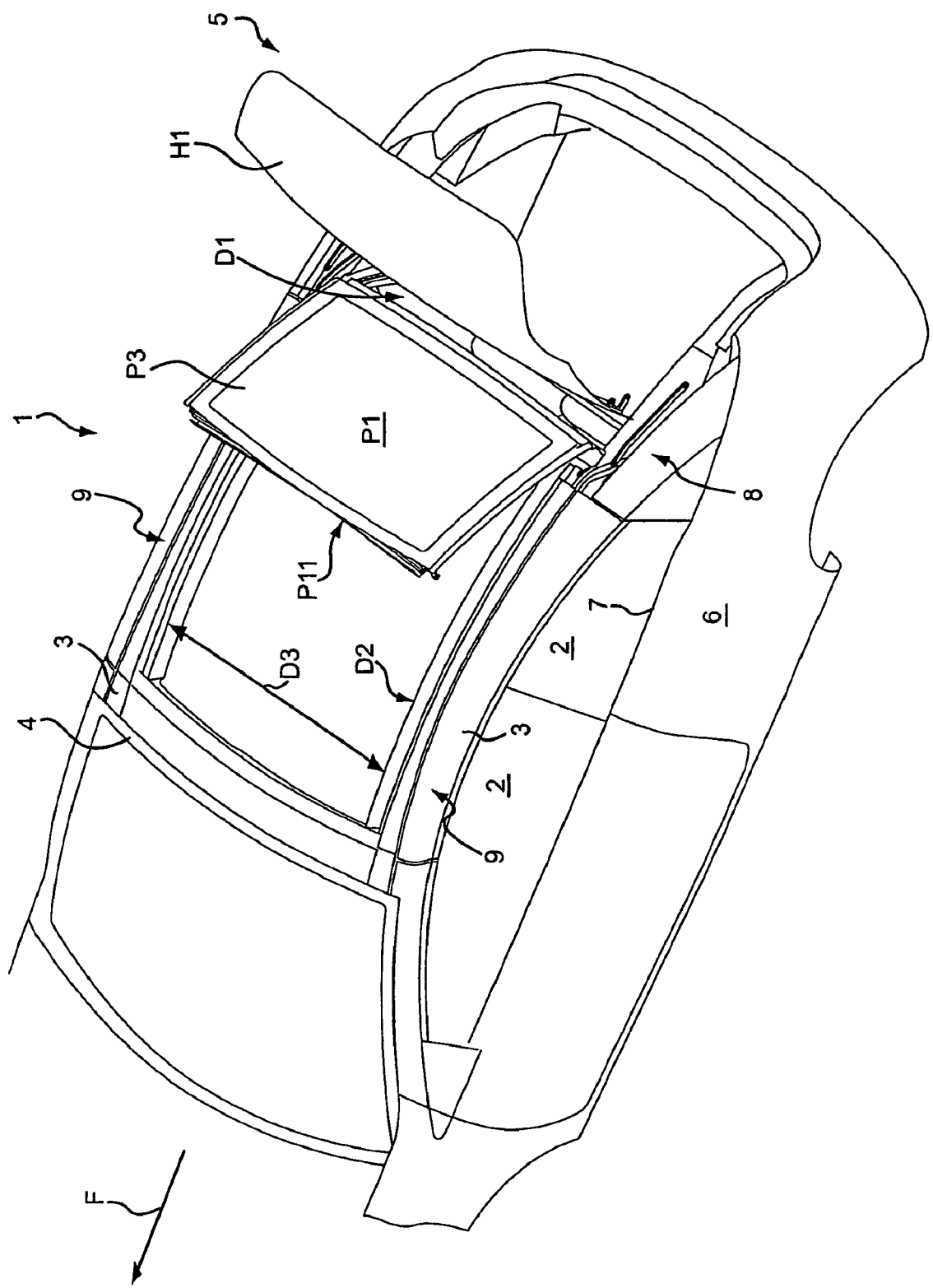
FIG. 4 shows a view similar to that of FIG. 3 during the opening of the two front panel sections.
Figure 5:
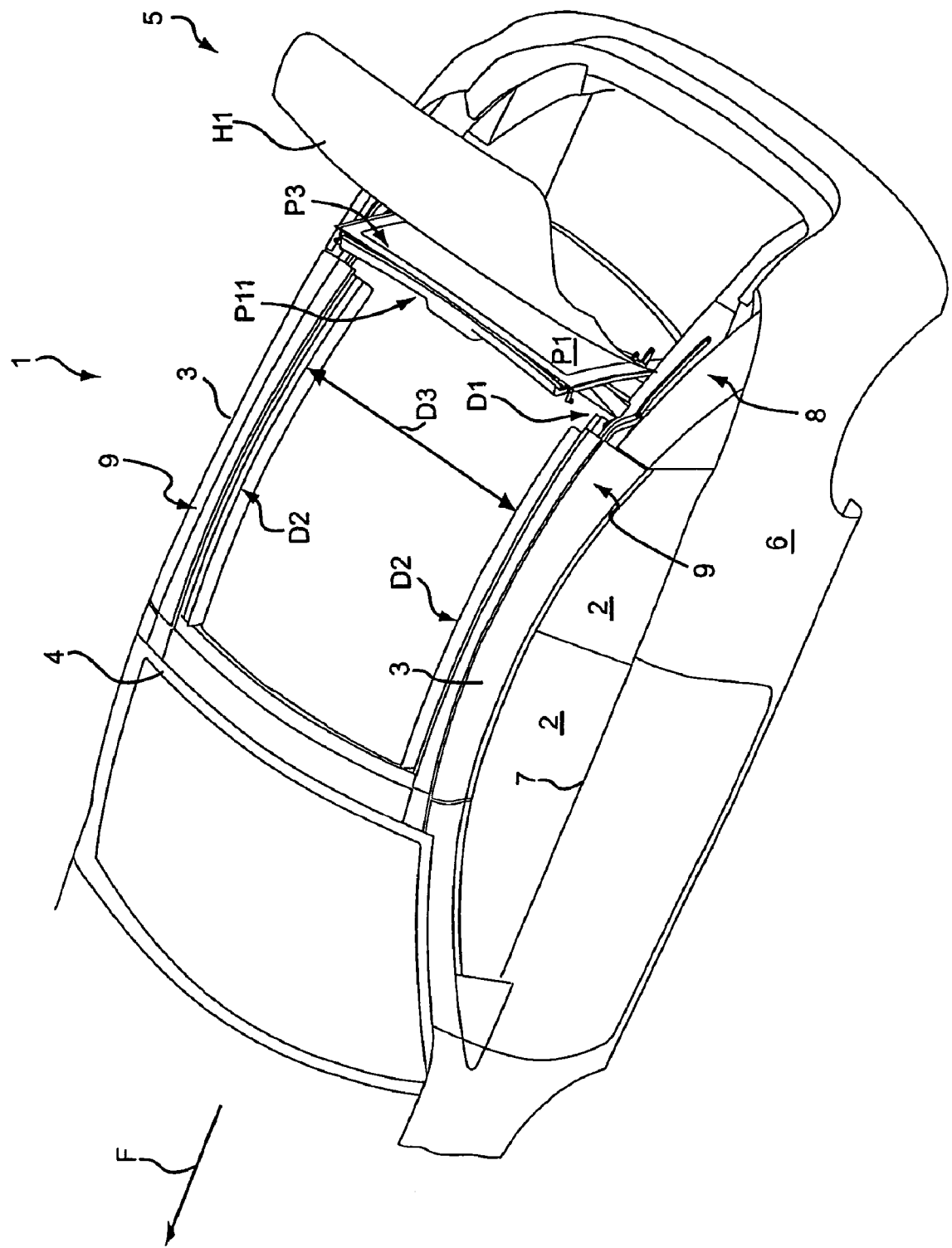
FIG. 5 shows a view similar to that of FIG. 4 with further progression of the opening of the front panel sections.
Figure 6:
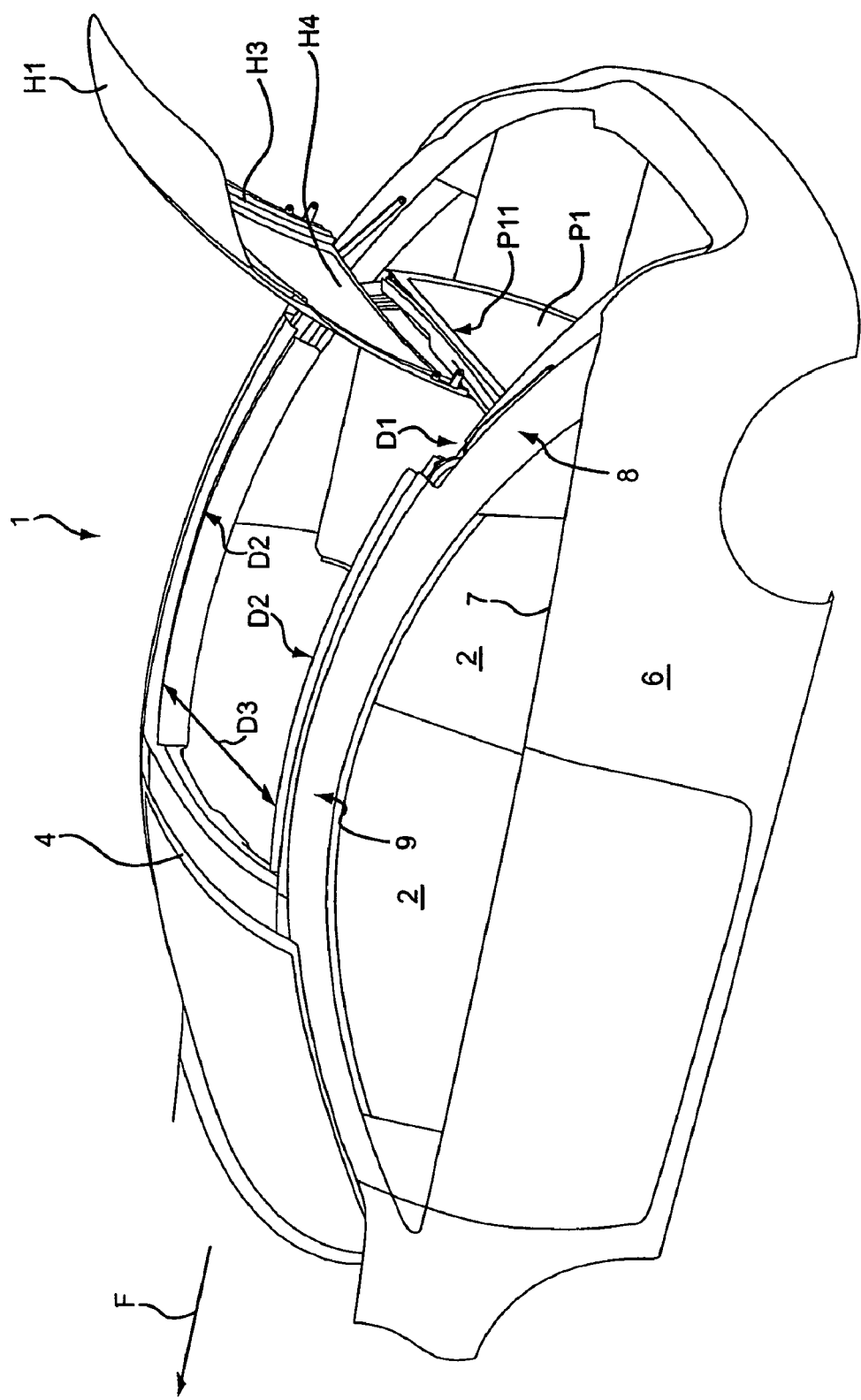
FIG. 6 shows a view similar to that of FIG. 5 with the front panel sections lowered essentially vertically into the automobile body.
Figure 7:
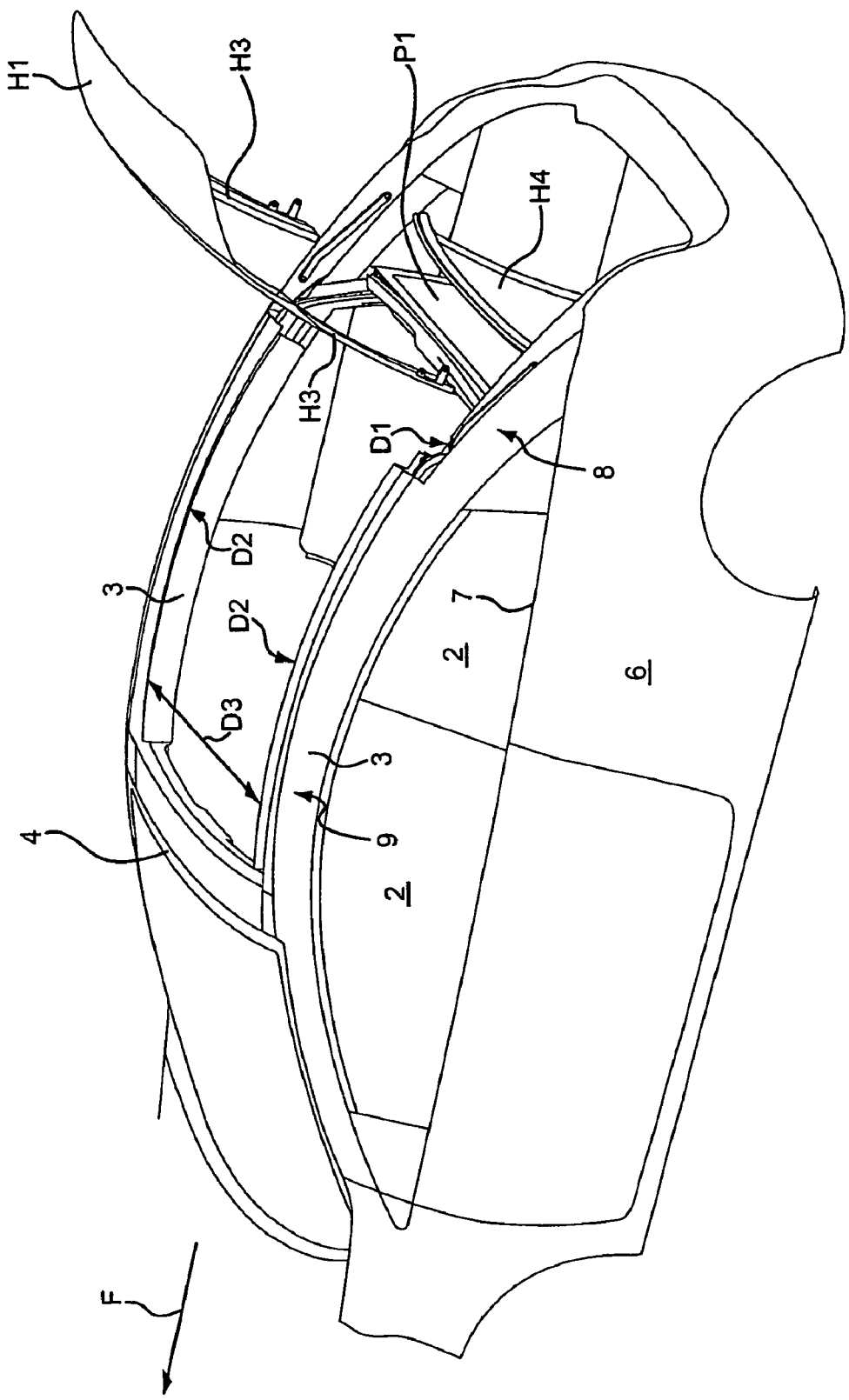
FIG. 7 shows a view similar to that of FIG. 6 with the rear window also lowered in its released position in the automobile body.
Figure 8:
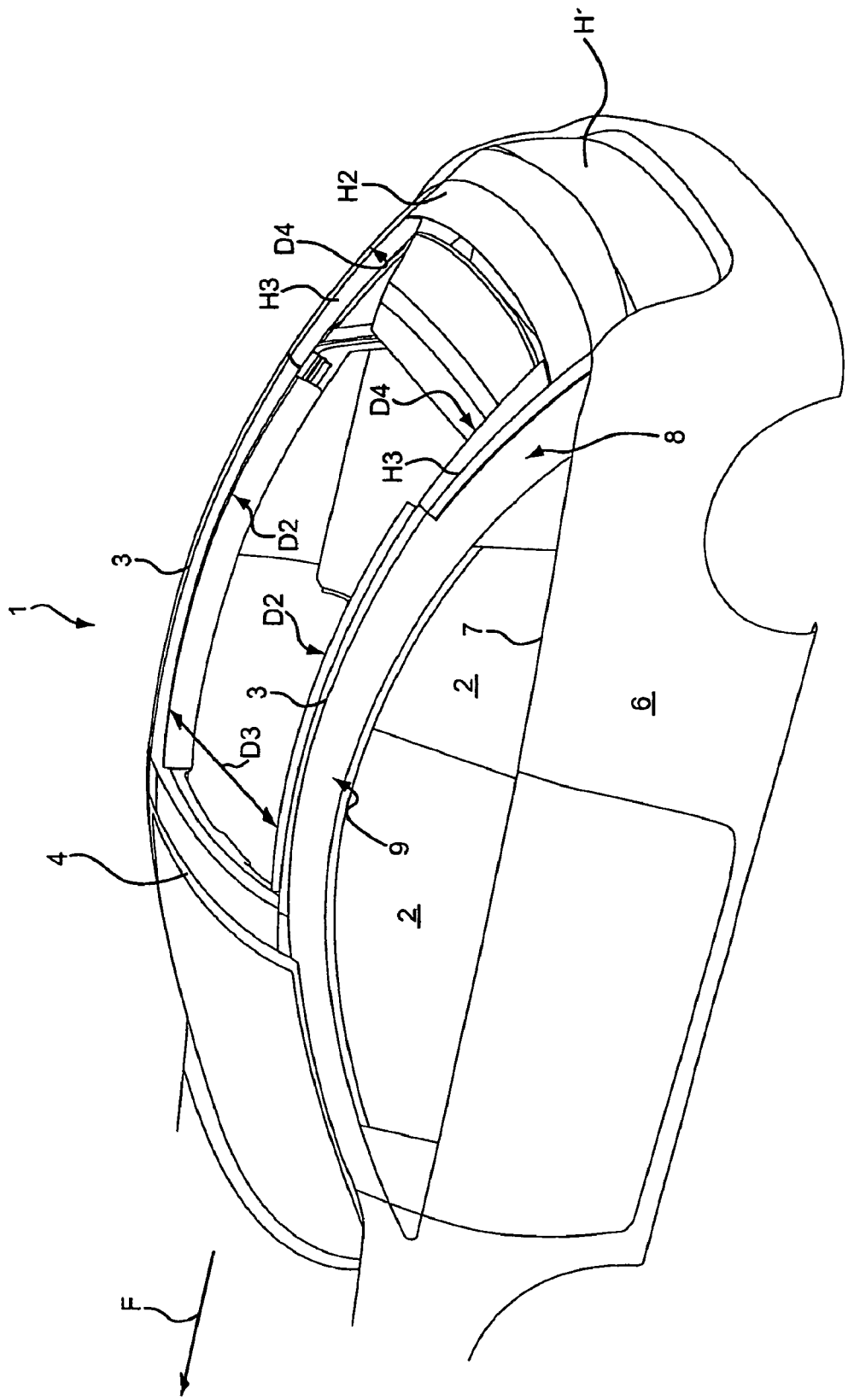
FIG. 8 shows a view similar to that of FIG. 7 after the hatch has been closed.
Figure 9:
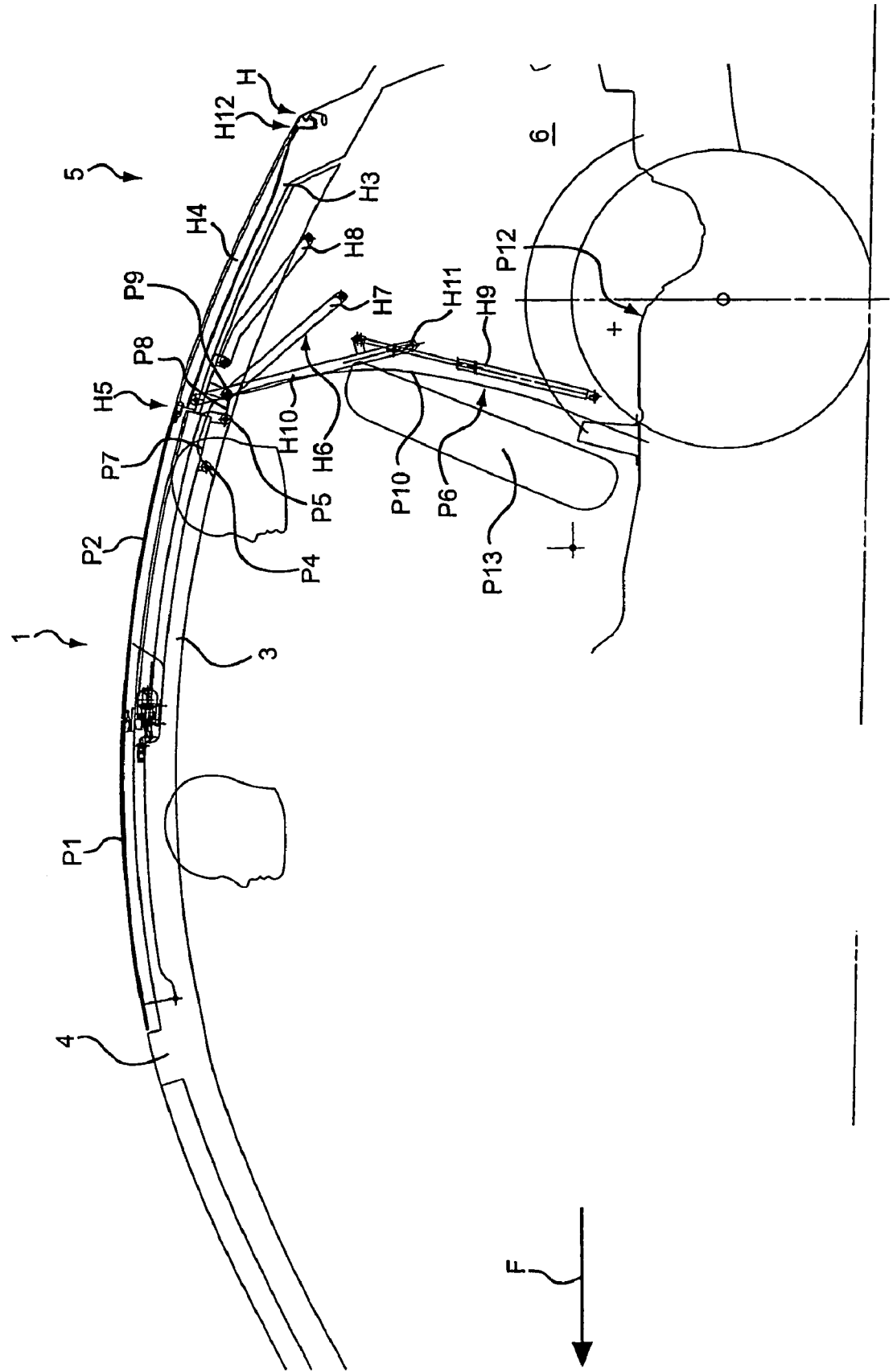
FIG. 9 shows a schematic side view of the vehicle in the roof position according to FIG. 1.
Figure 10:
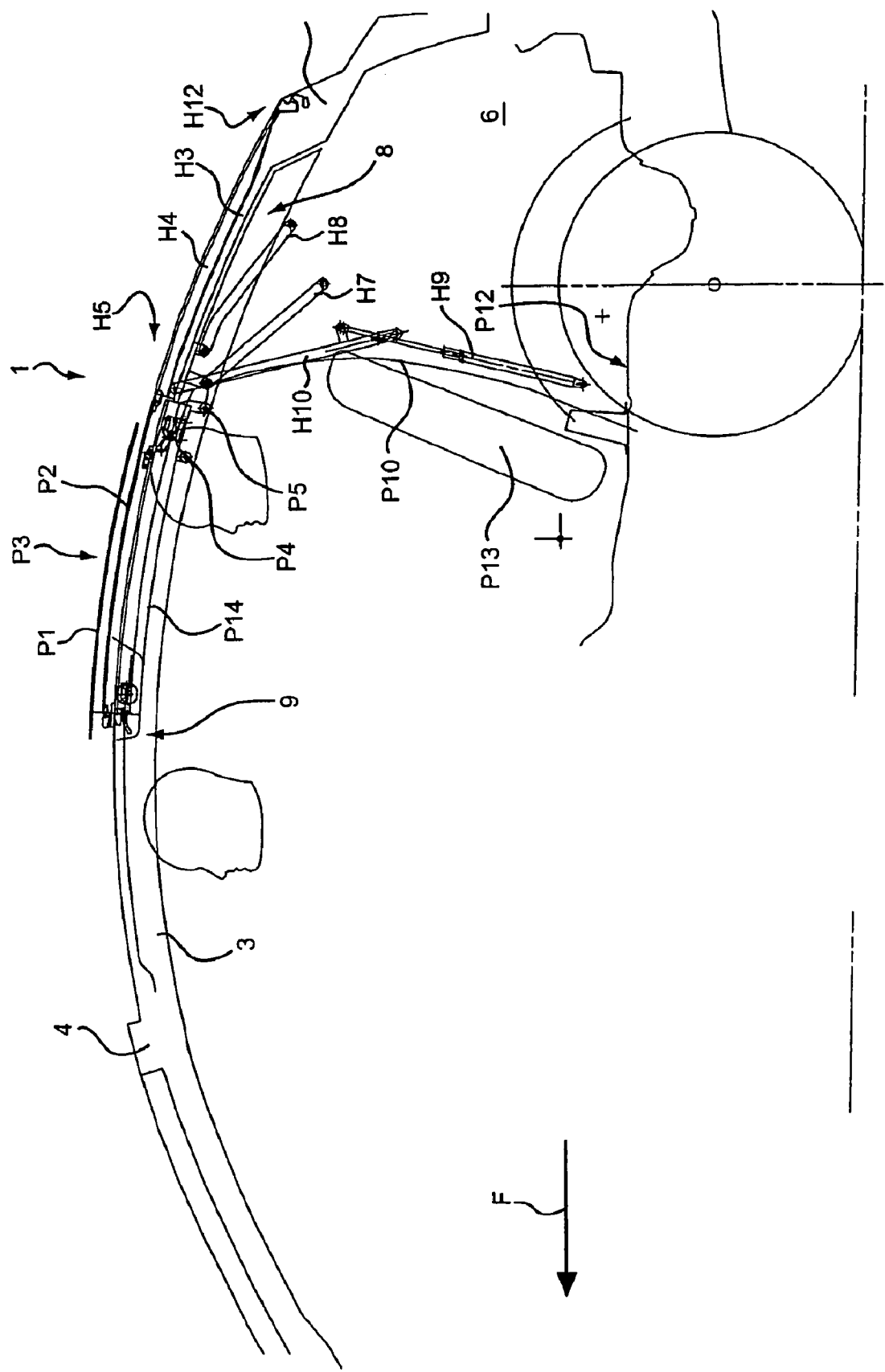
FIG. 10 shows a view similar to that of FIG. 9 but after the forwardmost panel section has been opened corresponding to the roof position of FIG. 2.

The hatch H1 is movably supported all together between a closed position (FIG. 1) and an open position (FIG. 3). The opening movement is not a pure swinging movement but rather occurs in such a way that in its open position, the front edge H5 of the hatch H1 is moved towards the rear relative to its closed position. For this purpose, the hatch H1 is supported (FIGS. 9 ff.) on each side of the vehicle, for example, by a multijoint linkage, which in the present case is a four-bar linkage H6. The links H7 and H8 of the linkage H6 are each articulated laterally in the automobile body 6, for example, in the rear region of the roof rails 3.

Figure 12:
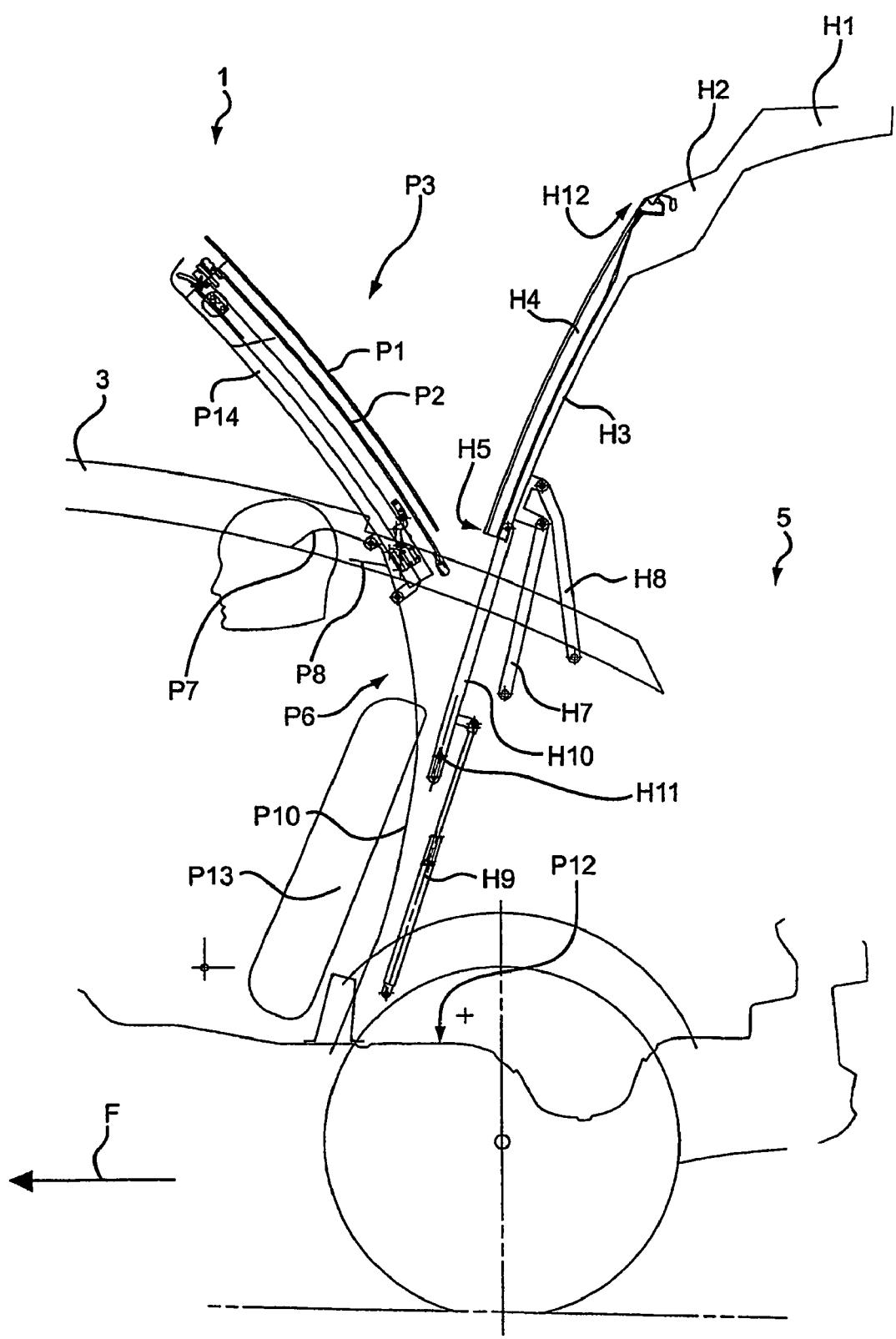
FIG. 12 shows a view similar to that of FIG. 11 but during the opening of the two front panel sections corresponding to the roof position of FIG. 4.

The rear window H4 can be lowered from the open position of the hatch H1 shown in FIGS. 3 and 12 into its separate released position in the automobile body 6.

For this purpose, in a first embodiment, the rear window H4 is connected with the automobile body 6 by linkage parts H9, H10 arranged laterally in the body 6. Linkage part H9 is a cylinder that can be extended and retracted. Due to its length variability, even when the rear window H4 is closed, the linkage part H9 is able to move along with the opening movement of the hatch H1, which then encloses the rear window (transition from FIG. 1 to FIG. 3).

The cylinder H9 is articulated at one end to the automobile body 6. Its free end acts on another link H10, which is articulated higher in the automobile body 6, and this point of application of force to the link H10 by the link H9 is located some distance from the articulation H11 of the link H10, so that a lever arm is produced.

Figure 15:
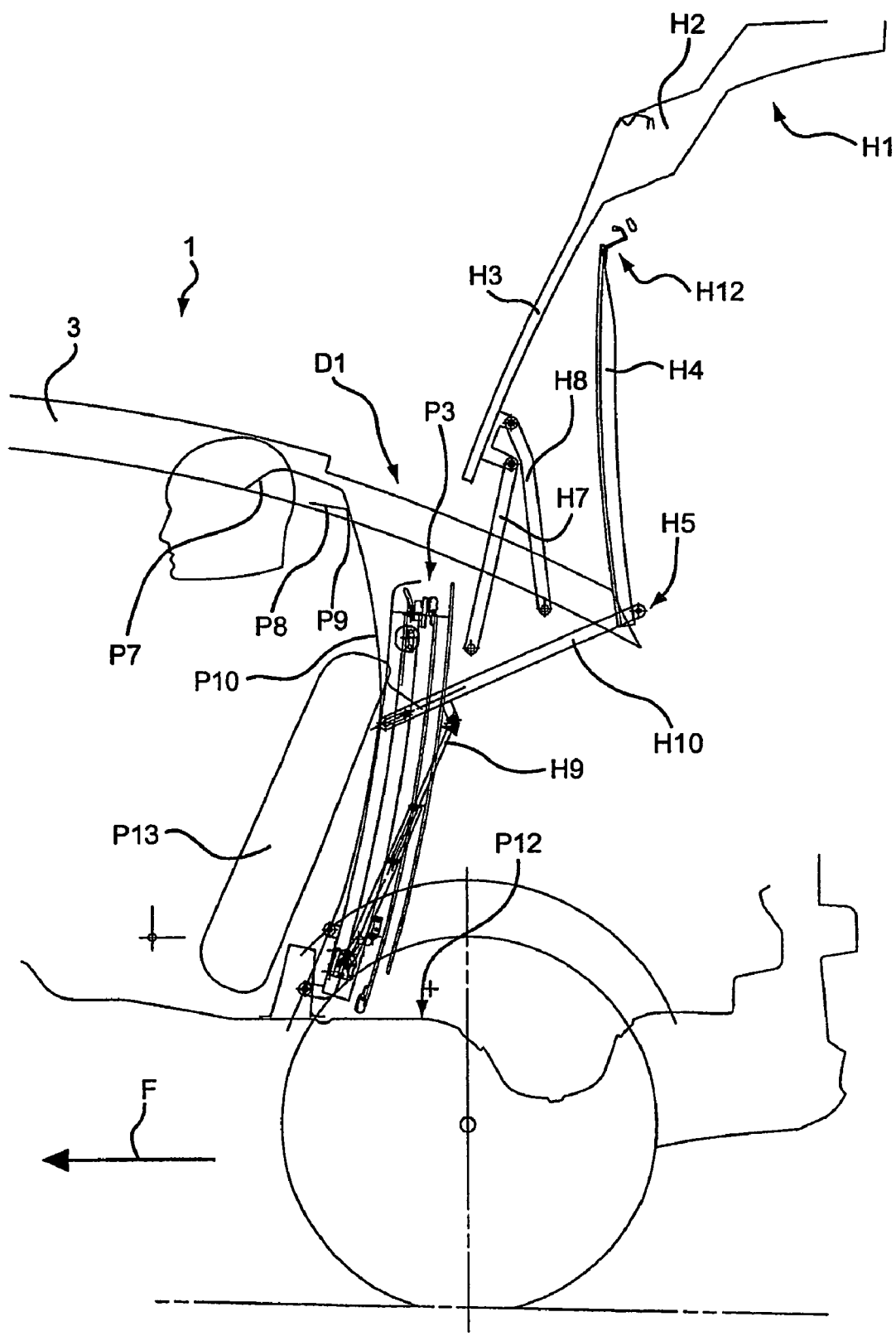
FIG. 15 shows a view similar to that of FIG. 14 but as the rear window is being swung out of its closed position in the hatch.
Figure 16:
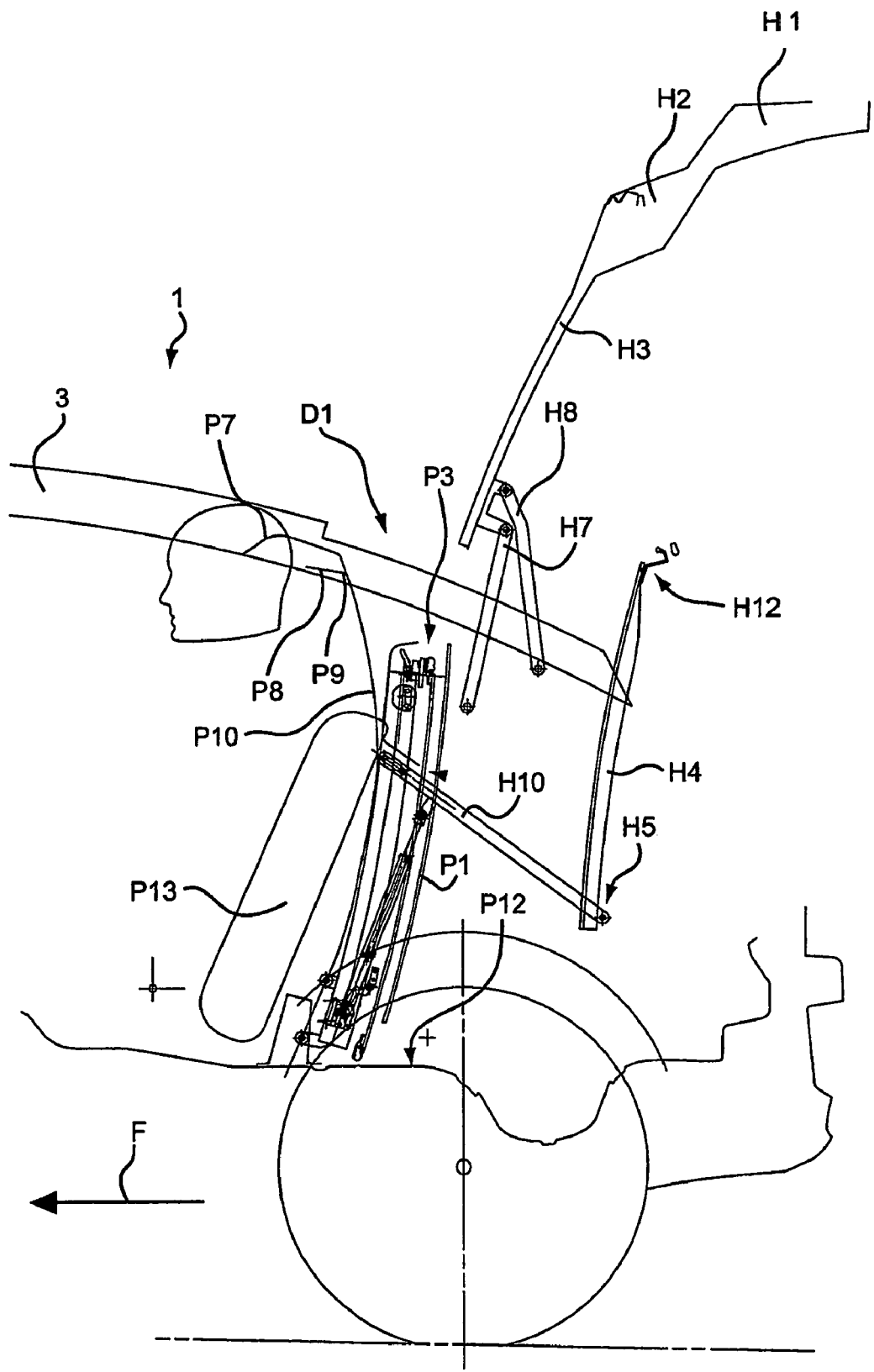
FIG. 16 shows a view similar to that of FIG. 15 with further progression of the opening of the rear window.

The free end of the link H10 acts laterally to the upper edge H5 of the rear window H4. To move the rear window H4 into its released position, the rear window H4 is first unlocked at its end H12, which forms the lower edge in the closed position, from the lower crosspiece H2 of the hatch H1 (transition from FIG. 14 to FIG. 15), and the rear window H4 can be manually held by a user at its lateral edges H13 and manually moved almost parallel downward (FIG. 16). During this operation, the lever H10 is swung downward about the joint H11, and the cylinder H9 retracts and swings forward. All together, the rear window H4 is thus lowered at least almost vertically and displaced slightly forward to save space. In its lowered position, it is stowed with other roof parts as a group, which will be explained in greater detail below.

Figure 17:
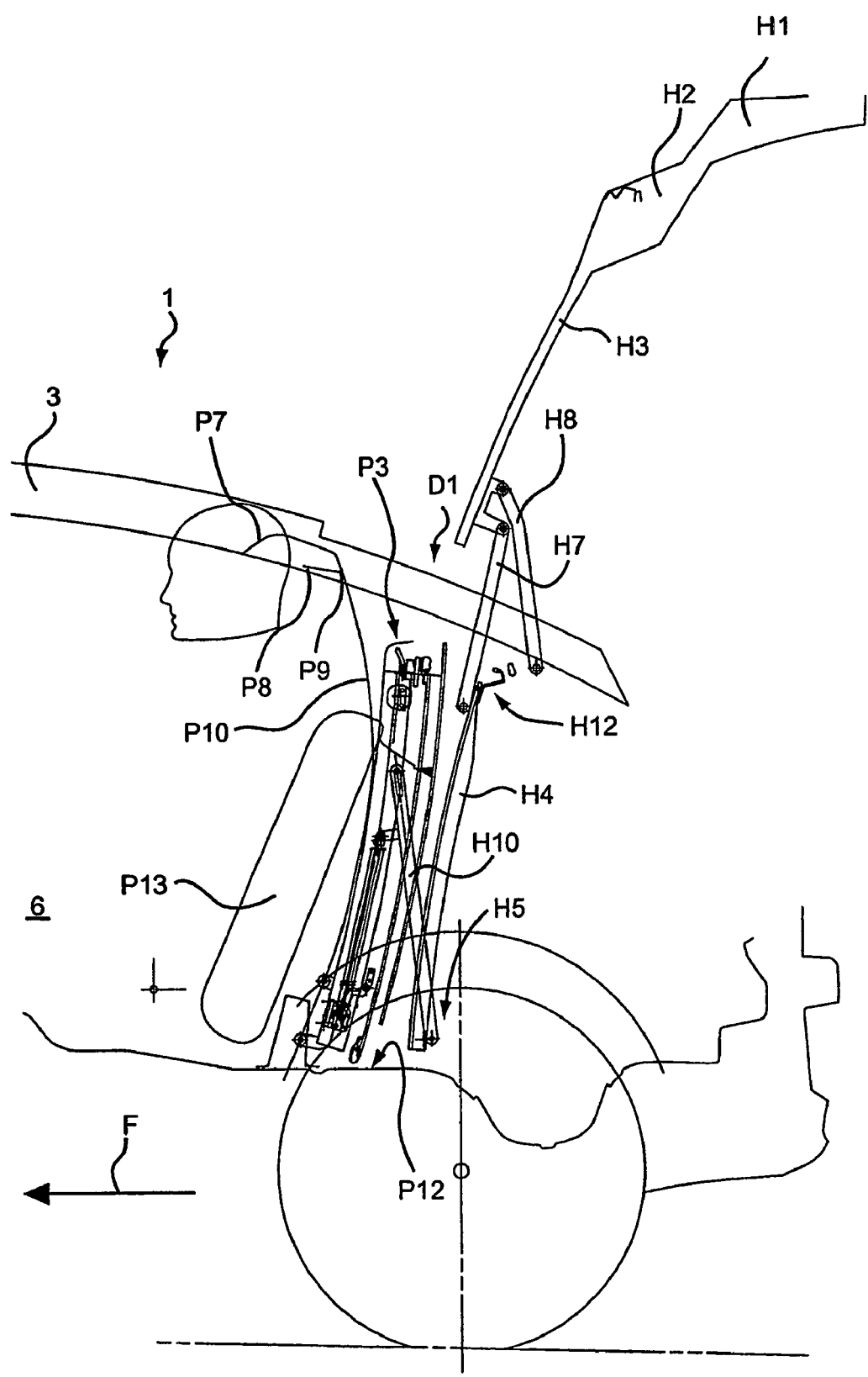
FIG. 17 shows a view similar to that of FIG. 16 with the rear window completely in its released position corresponding to the position of FIG. 7.
Figure 18:
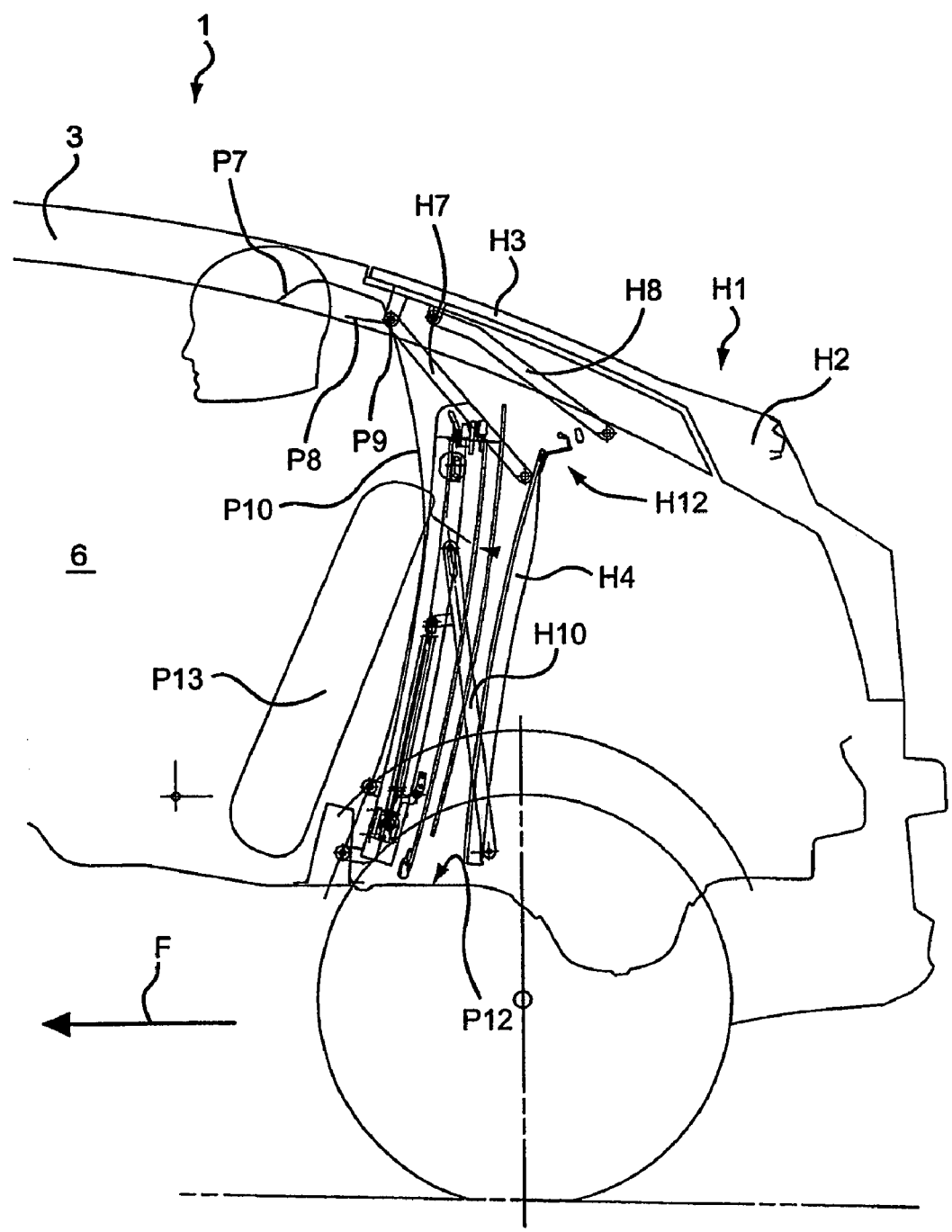
FIG. 18 shows a view similar to that of FIG. 17 after the hatch has been moved into its closed position corresponding to the position of FIG. 8.

In this released position (FIG. 17), the rear window H4 is held below a lateral belt line 7 of the automobile body 6 some distance from the hatch H1. The space between the side pieces H3 and the lower crosspiece H2 of the hatch H1 is completely opened. The hatch H1 can then be closed again (FIG. 18).

Figure 19:
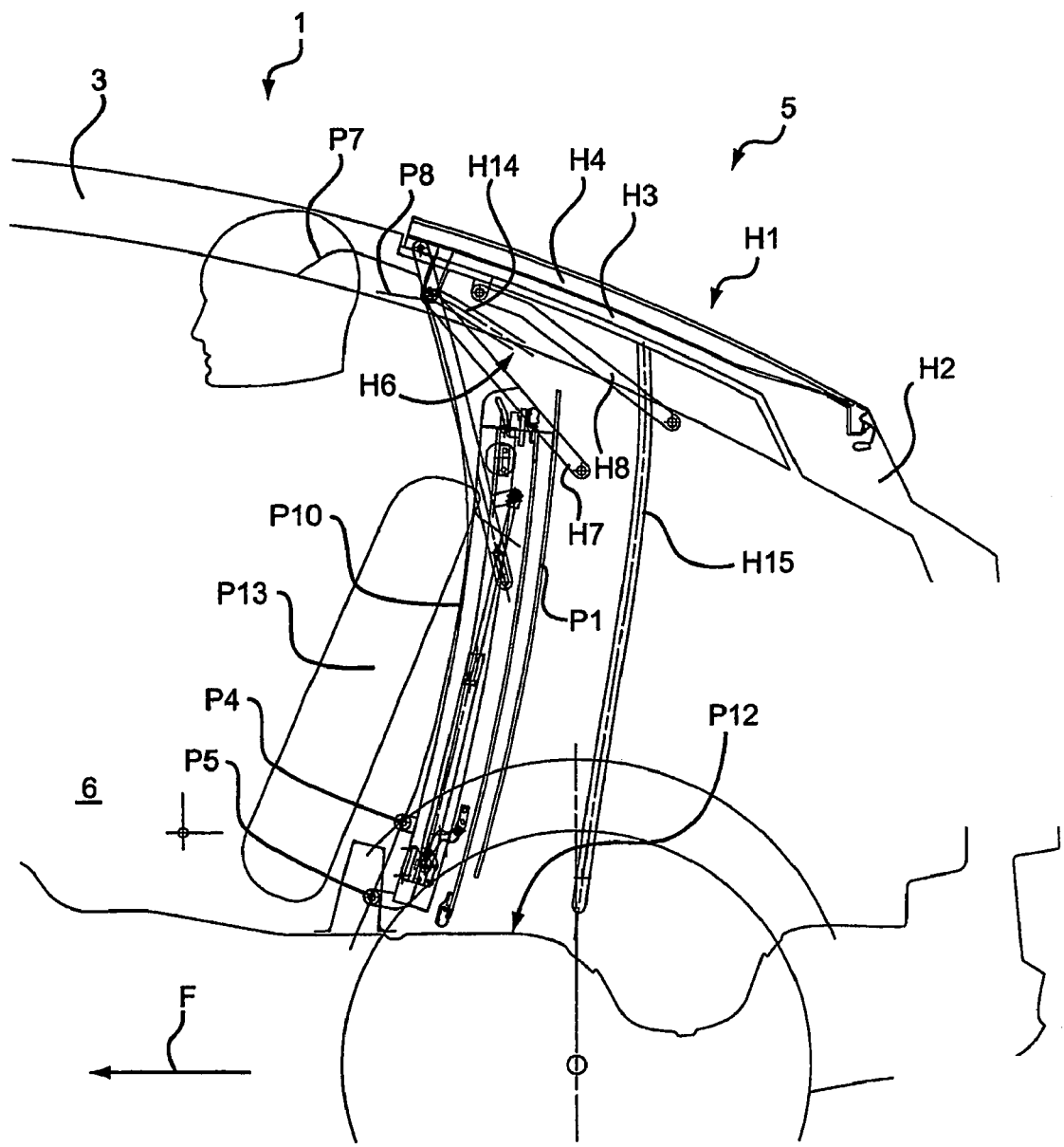
FIG. 19 shows an alternative design of the kinematic system for conveying the rear window into the released position, wherein the kinematic system contains separate lateral guide rails, with the front panel sections lowered and the hatch closed with the rear window in the closed position.
Figure 20:
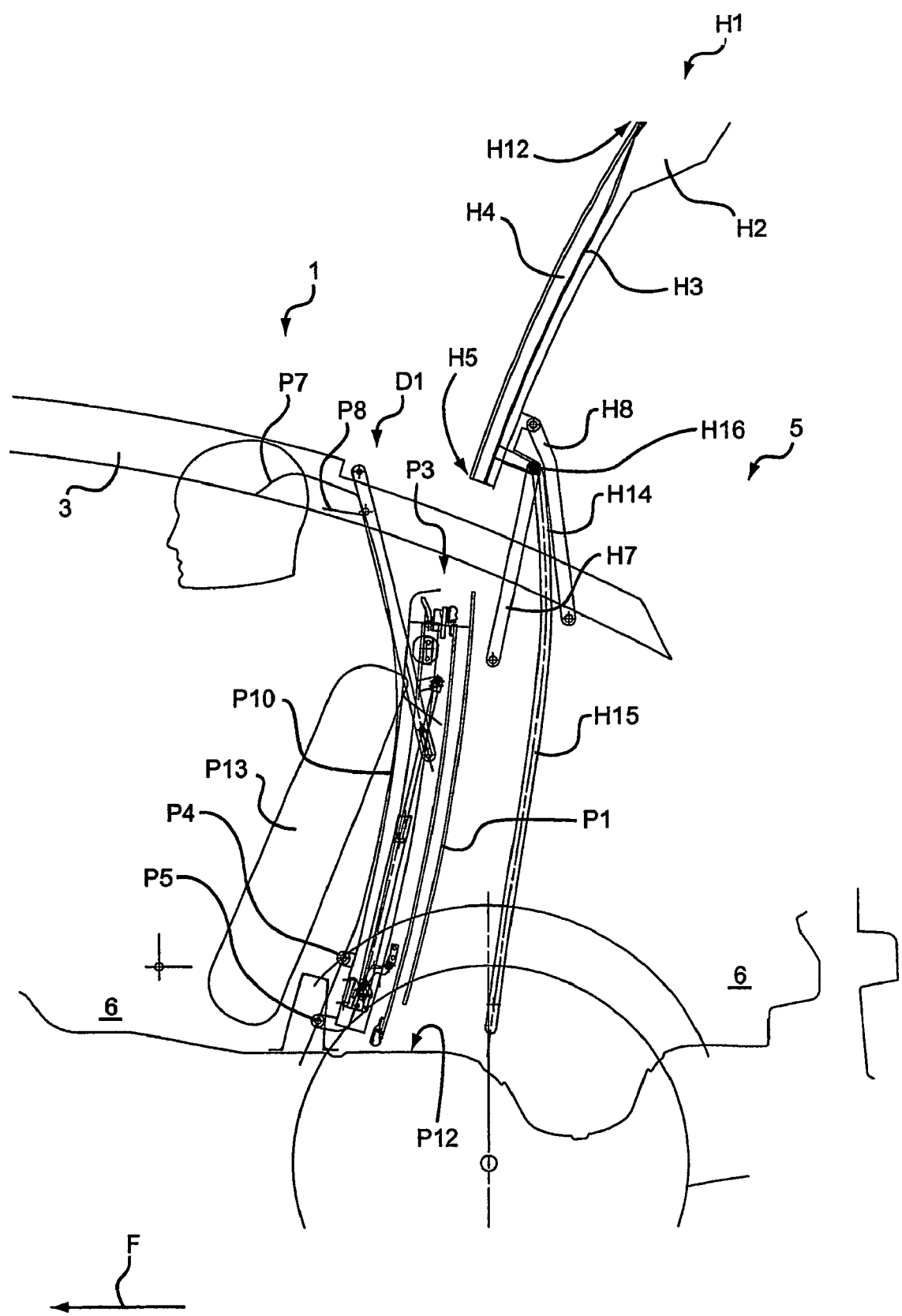
FIG. 20 shows a view similar to that of FIG. 19 with the hatch opened.

In a second embodiment (FIG. 19 to FIG. 23), the rear window H4 can be moved into its released position by lateral guide rail sections H14, H15. The guide rail H14, H15 is divided into two sections to allow its continuation over the roof rails 3 when the hatch H1 is open (FIG. 20) but also to allow the hatch H1 to ride over the guide rail when the hatch H1 is closed (FIG. 19). The first section H14 of the guide rail is coordinated with the four-bar linkage H6 and is moved into an upright position by a first link H7 when the hatch H1 is opened, which causes it to become automatically aligned with the lower section H15 of the guide rail, which is fixed in the automobile body 6 (transition from FIG. 19 to FIG. 20).

Figure 21:
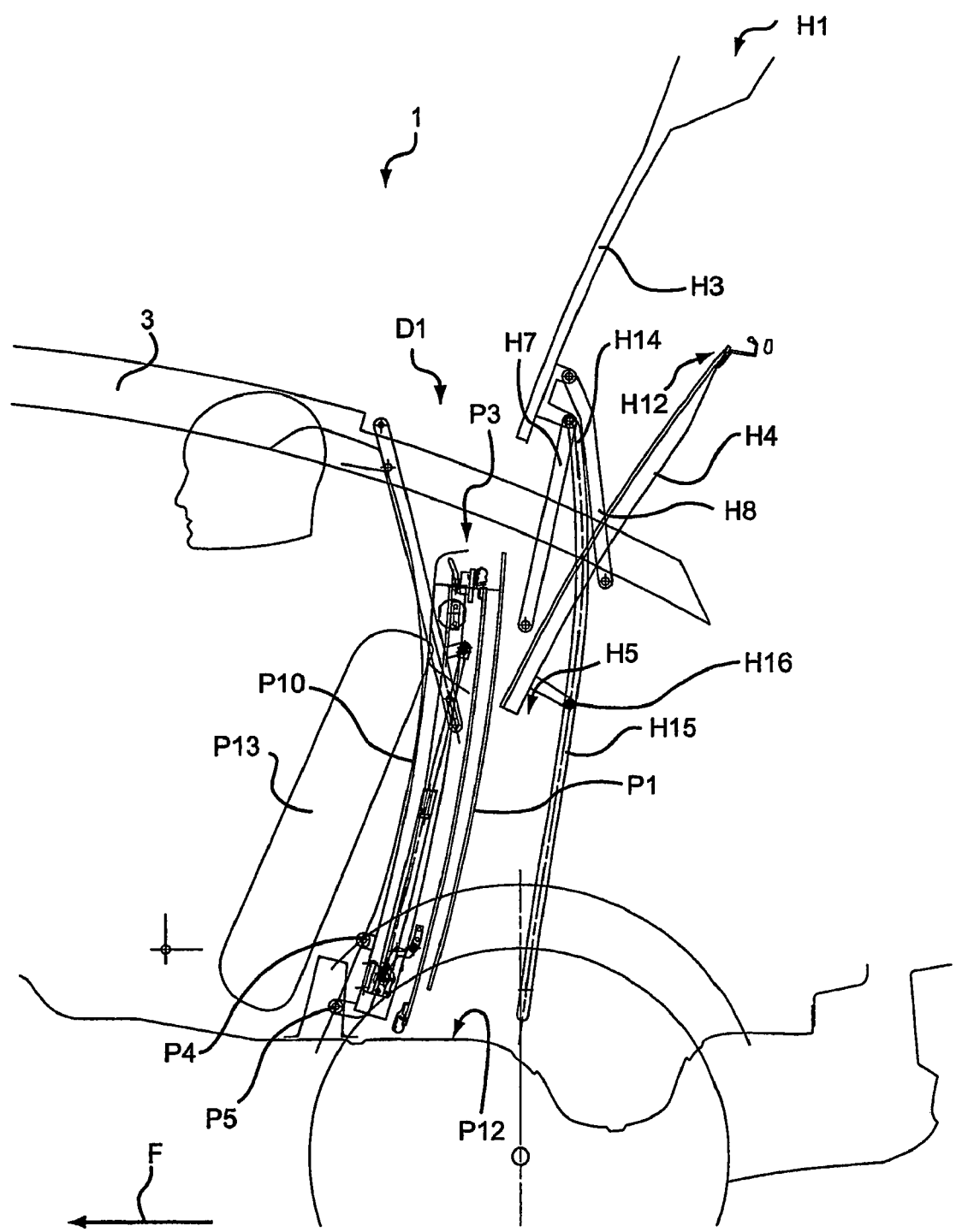
FIG. 21 shows a view similar to that of FIG. 20 during the movement of the rear window out of the parts of the hatch that surround it into the released position.
Figure 22:
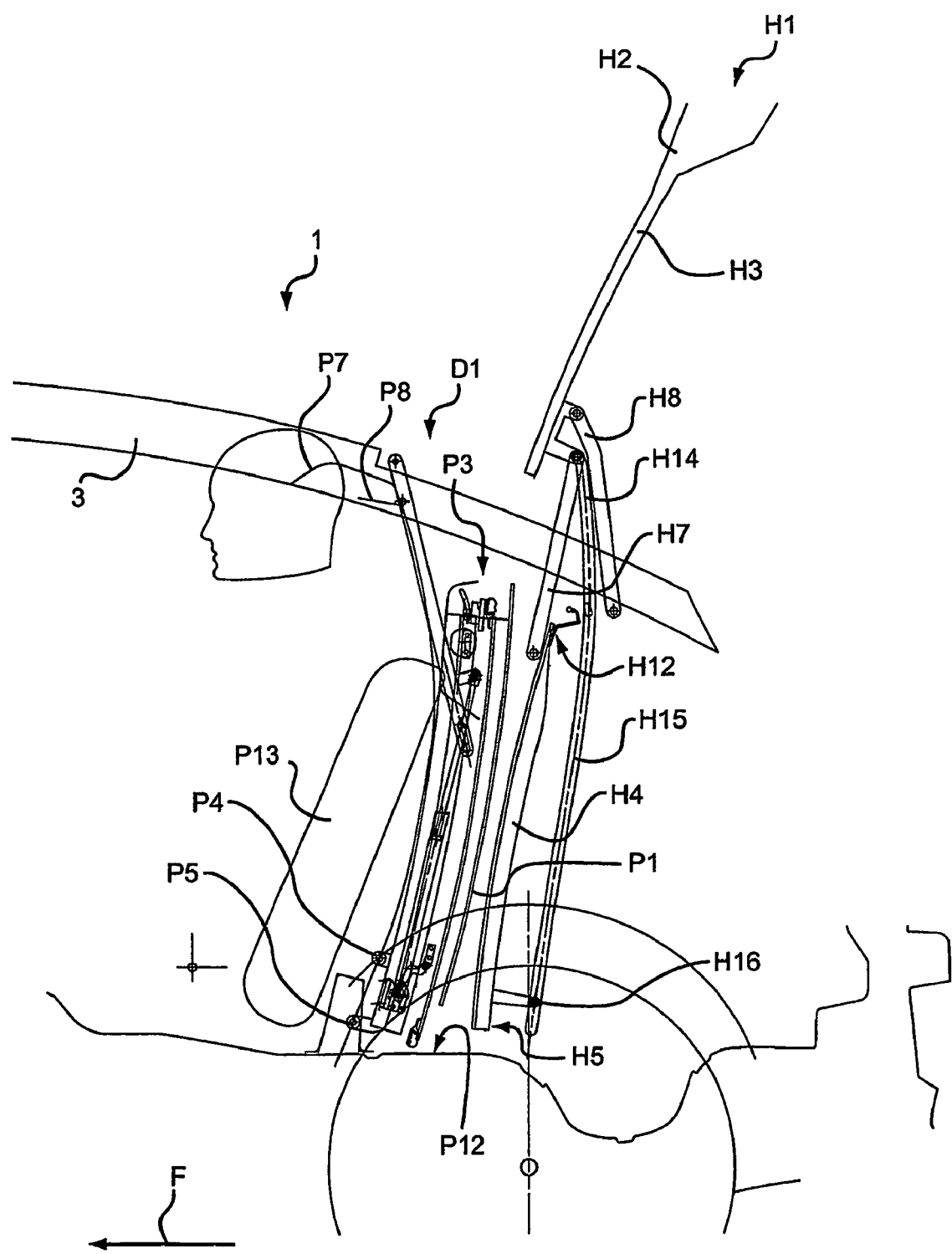
FIG. 22 shows a view similar to that of FIG. 21 with the rear window in its released position.

Here again, to move the rear window H4 into its released position, the rear window H4 is first unlocked at its end H12, which forms the lower edge in the closed position, from the lower crosspiece H2 of the hatch H1 (transition from FIG. 20 to FIG. 21), and the rear window H4 is manually held by a user at its lateral edges H13 and can be manually moved almost parallel downward in the guide rail H14, H15 by means of bearing journals H16 located in the lateral region of the upper edge H5 (FIG. 21).

Figure 23:
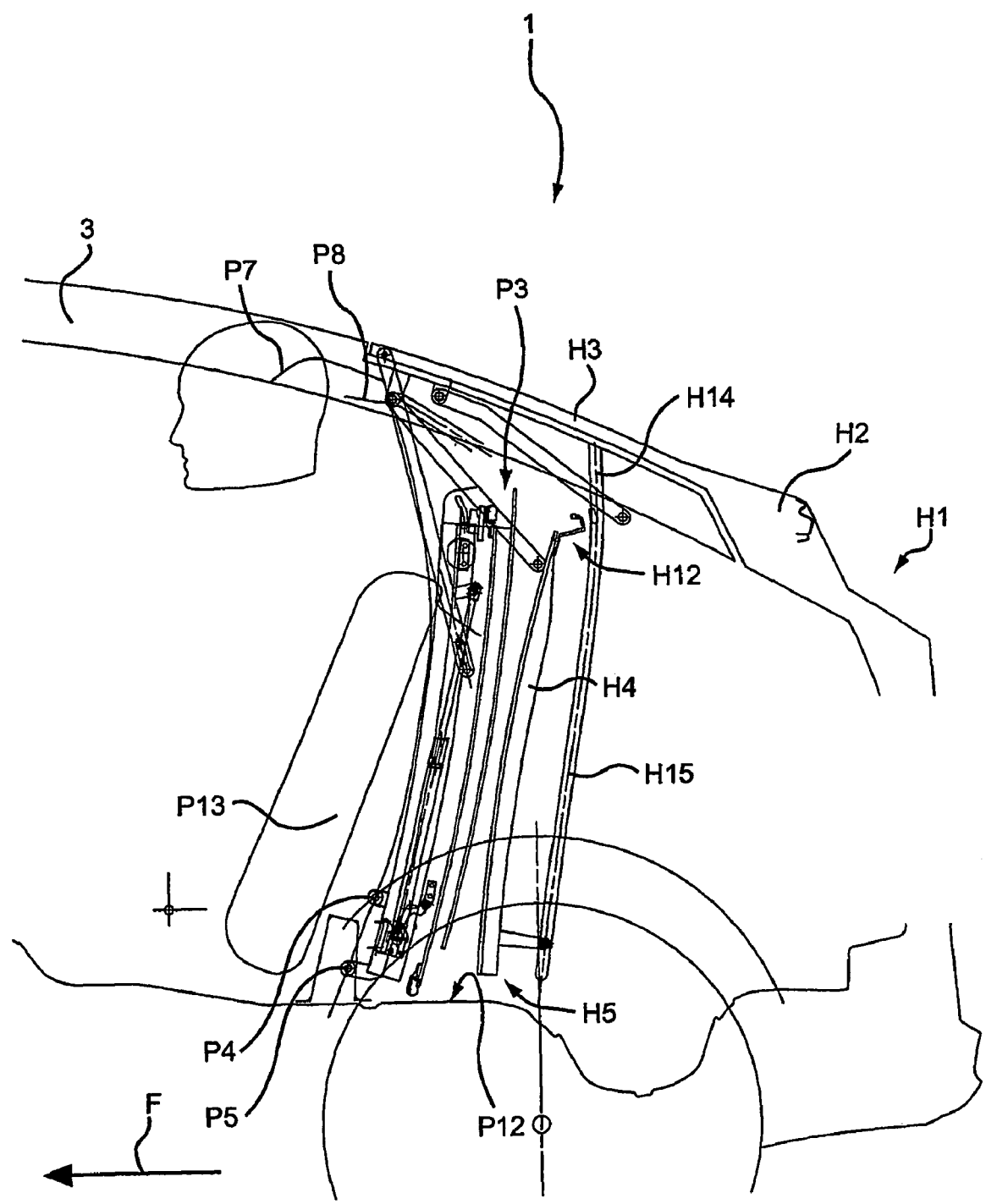
FIG. 23 shows a view similar to that of FIG. 22 after the hatch has been closed.

In this embodiment as well, all together, the rear window H4 is lowered at least almost vertically into its released position, in which it is displaced slightly forward to save space, and is held below a lateral belt line 7 of the automobile body 6. The hatch H1 can then be closed again (FIG. 23).

In the illustrated embodiments, in the closed position of the rear window H4 (FIG. 1), the motor vehicle 1 has additional movable panel sections P1, P2 immediately in front of the front edge H5 of the rear window H4 with respect to the direction of vehicle travel. The number of these panels is variable, depending on the length of the roof. In the closed state, they are arranged essentially horizontally one behind the other, are flush with each other and are flush with the rear window H4. They are supported directly or indirectly on the lateral roof rails 3. The (in this case) two roof sections P1 and P2 can be made of various materials, such as metallic, glass or plastic materials. In particular, they can be essentially transparent materials. In this regard, to prevent "shadow stripes" in the interior as much as possible, it is advisable that the roof sections P1, P2 not be made too narrow in the longitudinal-direction of the vehicle. Therefore, a minimum length of 40 cm in the longitudinal direction of the vehicle is advantageous.

Figure 2:
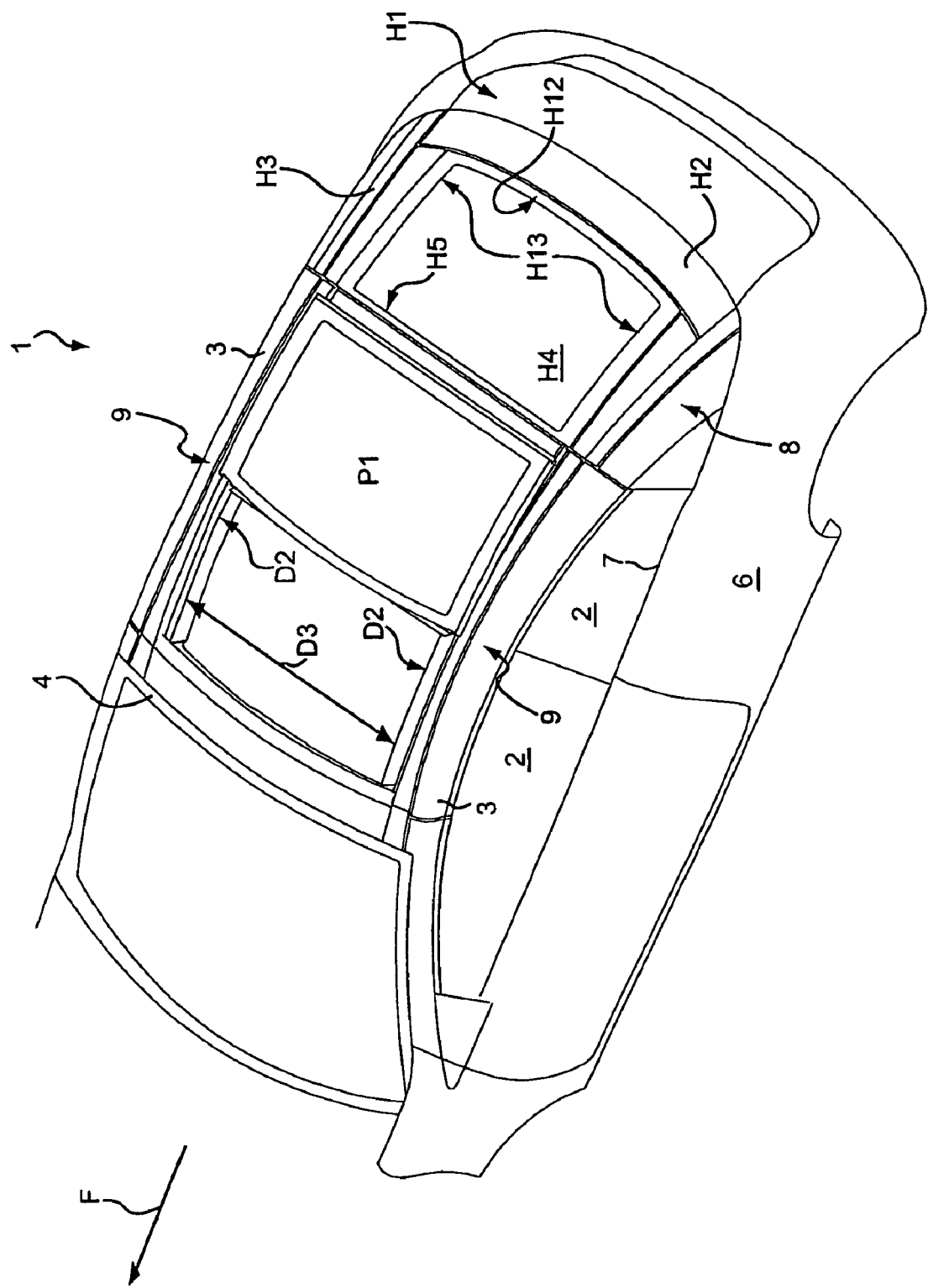
FIG. 2 shows a view similar to that of FIG. 1 after the forwardmost panel section has been opened.

The front roof section P1 can be moved in the manner of a sliding sunroof from the closed position to a position over the rear roof section P2. In its opened position, it rests essentially parallel on roof section P2 (FIGS. 2 ff.). The position of the roof sections P1, P2 produced in this way represents a possible permanent driving position. However, from this position, the roof can be opened further with a downward displacement of the combined stack P3 of roof sections P1 and P2, which is lowered within the automobile body 6.

For this purpose, the stacked group of roof sections P3 formed in this way is supported in the rear region of the rear roof section P2 by two guide rollers P4, P5 arranged one behind the other in a lateral guide rail P6.

Figure 11:
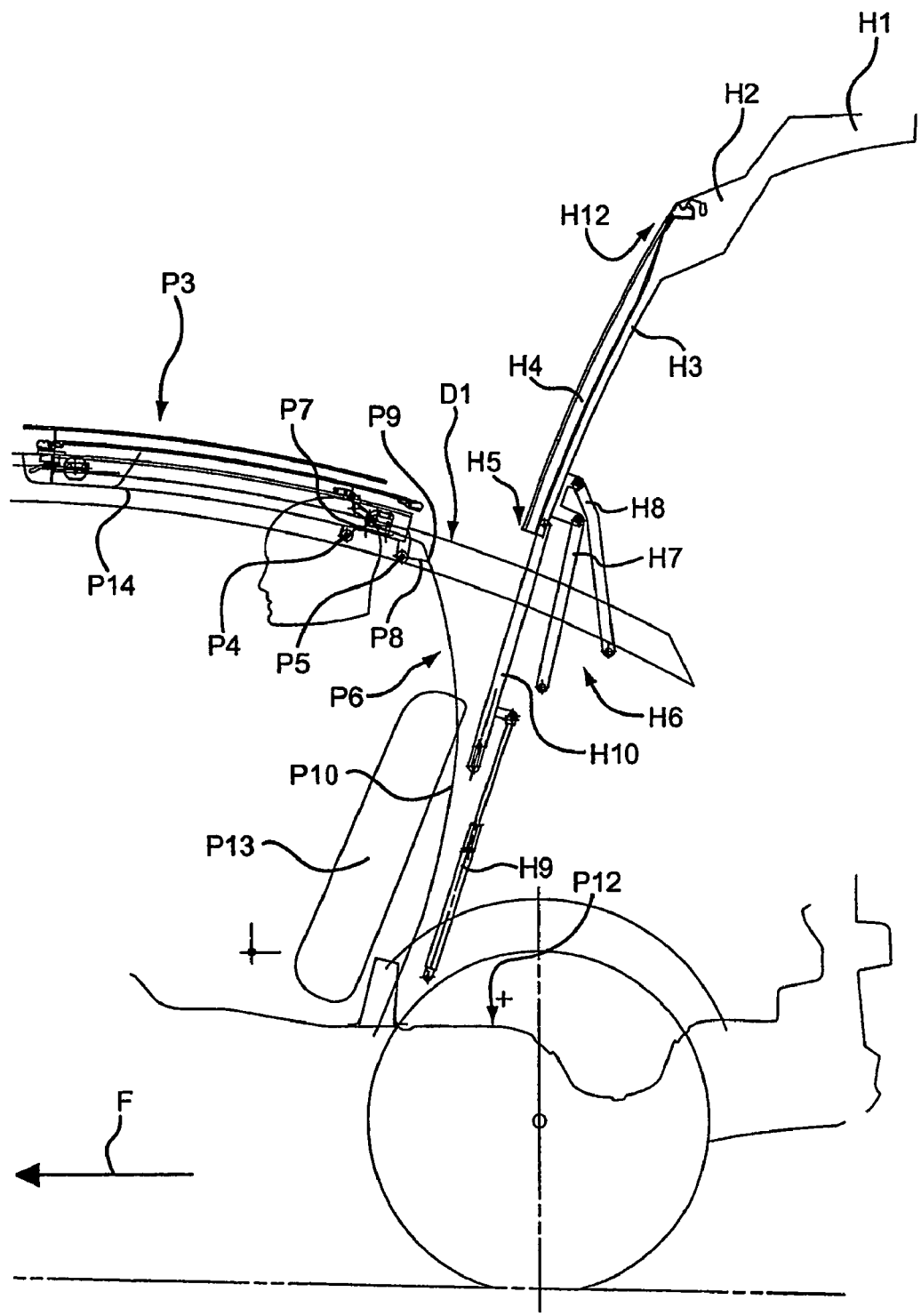
FIG. 11 shows a view similar to that of FIG. 10 but with the hatch in the open position corresponding to the roof position of FIG. 3.

When the operation of lowering the stack of roof sections P3 in the automobile body 6 begins (transition from FIG. 11 to FIG. 12), the front roller P4 of the pair of guide rollers P4, P5 runs towards the rear on an upwardly directed guideway section P7, whereas the rear guide roller P5 initially runs in an almost horizontal guideway section P8. At point P9, the section P8 enters the gently curved, downwardly running section P10 of the guide rail P6.

Due to the rearwardly and upwardly directed slope of the section P7, as the stack of roof sections P3 starts to move, its forward edge P11 is immediately raised, so that the head clearance, even for passengers sitting in the back seat, does not during any phase of the movement fall below the amount of head clearance present when the roof sections P1, P2 are closed.

Figure 13:
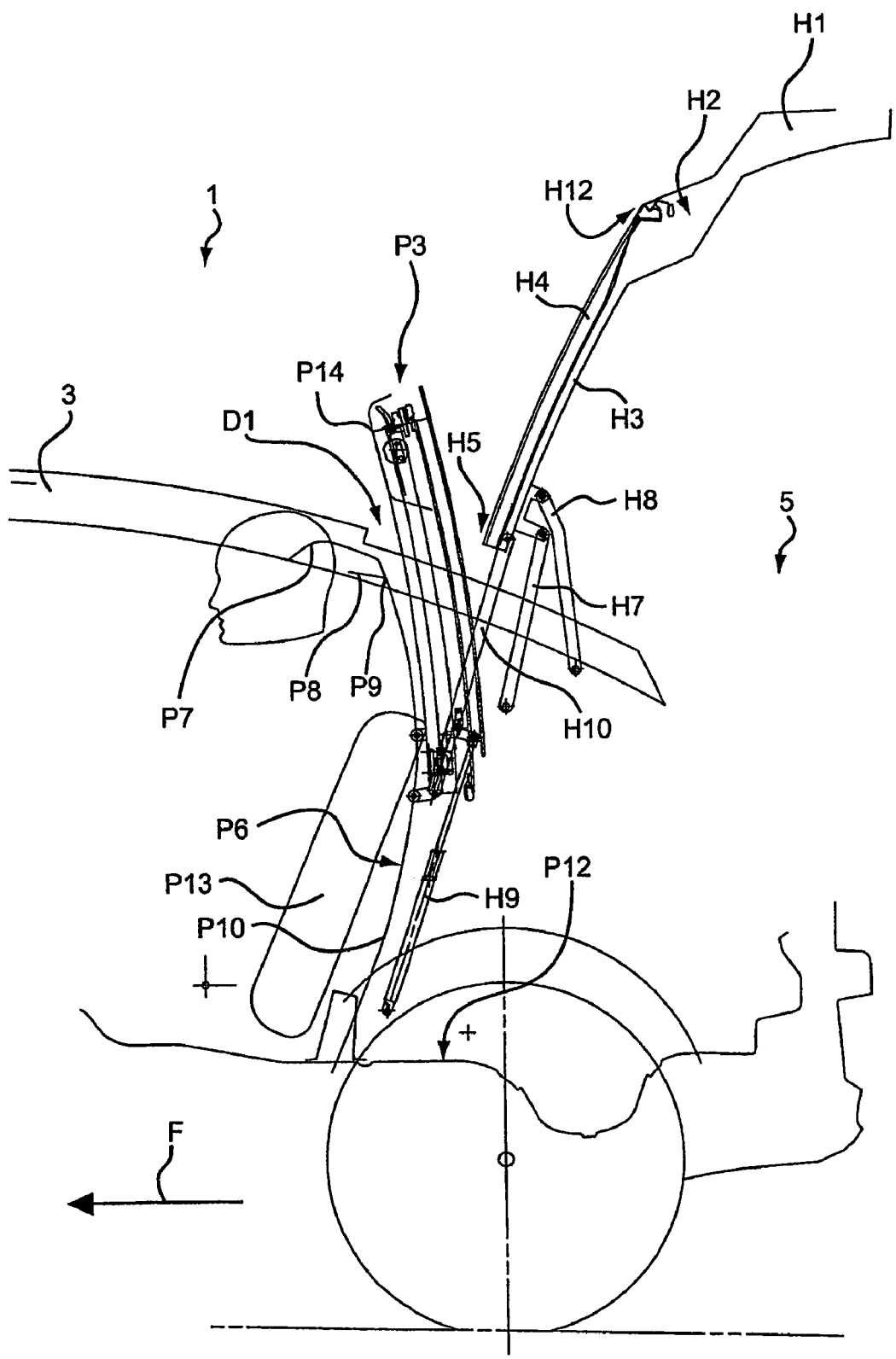
FIG. 13 shows a view similar to that of FIG. 12 but during further progression of the opening of the front panel sections corresponding to the roof position of FIG. 5.
Figure 14:
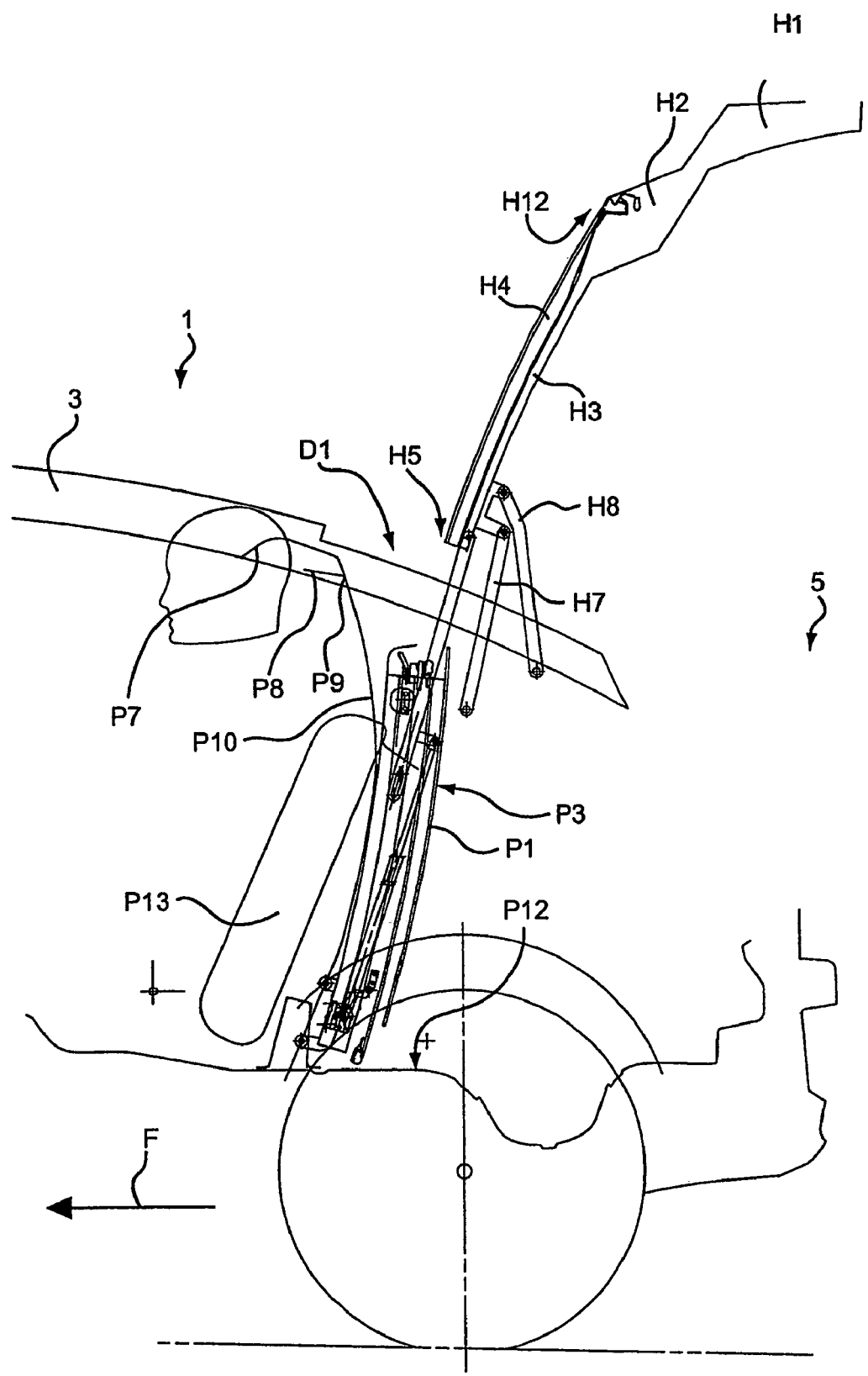
FIG. 14 shows a view similar to that of FIG. 9 but with completely opened front panel sections corresponding to the roof position of FIG. 6.

When the rear guide roller P5 enters section P10, the front guide roller P4 runs in a section of the guideway P6 that follows the curve of the lateral roof rails 3, so that with the almost vertical downward movement of the rear guide roller P5, the steep orientation of the stack of roof sections P3 increases, and when the front guide roller P4 also enters the section P10, the stack P3 assumes an almost vertical position (FIG. 13). In this position, it can slide downward to the inner vehicle base P12 and assume an almost vertical position slightly behind the backrests P13 of the second row of seats to save space (FIG. 14).

The closing of the roof sections P1, P2 proceeds correspondingly but in the opposite direction, and in this operation as well, the head clearance does not during any phase of the movement fall below the amount of head clearance present when the roof sections are closed. The vehicle silhouette can thus be kept very flat and sporty.

If the front roof section P1 borders directly on the windshield frame 4, a very large roof opening can be created. The lateral autobody sections 3 above the side windows can also be designed very narrow, so that the width of the panel sections P1 and P2 can extend almost to the upper edge of the side windows.

To facilitate the lowering of the roof sections P1 and P2, the hatch H1, as has already been described, can open in such a way that in its open position, the front edge H5 is displaced to the rear relative to its closed position. This results in a passage space D1 in front of the opened hatch H1 with respect to the direction of vehicle travel F, and this passage space D1 lies completely behind the rear edge of the rear roof section P2 in its closed state. In this way, the lowering path of the stack of roof sections P3 through the interior of the vehicle can be shifted far to the rear in the vehicle 1. Any passengers that may be seated in the back seat are not disturbed by the lowering operation.

In this regard, in the closed state of the hatch H1, the frame parts H3, which laterally frame the rear window H4, can be aligned with the roof rails 3, which follow them towards the front in the direction of travel. A very advantageous visual effect is achieved in this way. In particular, in this case, no gradation is necessary in the inner edge D2 of the specified sections H3, 3 that faces the rear window H4 and the moving roof sections P1, P2, but rather this edge D2 runs straight over the entire interior.

However, when the hatch H1 is opened, a passage space D1 is opened that is wider than the clear width D3 between the inner edges D2. This makes it possible to design the roof sections P1 and P2 very wide. A guide rail P14, which projects laterally beyond the roof section P2 and in which the front roof part P1 is guided in its open position, can additionally enter the interior of the automobile body 6 with the stack of roof sections P3 through the widened passage space D1.

To open the two sections P1 and P2 and the rear window H4, the hatch H1 is first opened to free the passage space D1. The roof sections P1, P2 can then be opened in the manner described above.

Prior to or after this, from the opened position of the hatch H1, the rear window H4 can be opened out of the frame pieces H2, H3 in one of the aforementioned ways and lowered into the interior in a space-saving position parallel to the roof sections P1 and P2. It is also possible to open only the rear window H4; only the front panel section P1; the rear window H4 and the panel section P1; or only the two forward roof sections P1 and P2.

The invention can be used both in vehicles with manually moved roof sections P1, P2, H4 and in vehicles with fully automatically or semiautomatically moved roof sections.

The invention claimed is:

1. Motor vehicle (1) comprising an automobile body and a movable hatch (H1) that encloses a rear window (H4) in at least one position of the hatch, wherein the rear window (H4) is separately movable from a closed position relative to regions (H2; H3) that surround the rear window and into a released position, wherein the rear window (H4) can be lowered in a released position thereof in a region of the automobile body (6) some distance from the hatch (H1), wherein the hatch (H1) comprises side pieces (H3) which, in the closed position of the hatch, are directed forward and upward, and wherein the hatch comprises a lower crosspiece (H2), wherein the sidepieces and the lower crosspiece, in the closed position, enclose the rear window.

2. Motor vehicle (1) in accordance with claim 1, wherein the rear window (H4) is held on the vehicle (1) in each position and phase of movement.

3. Motor vehicle (1) in accordance with claim 1, wherein the rear window (H4) can be lowered when the hatch (H1) is in an open position.

4. Motor vehicle (1) in accordance with claim 1, wherein in the open position, the rear window (H4) can be lowered at least mostly below a lateral belt line (7) of the automobile body (6).

5. Motor vehicle (1) in accordance with claim 1, wherein in its released position, the rear window (H4) is held at least approximately vertically.

6. Motor vehicle (1) in accordance with claim 1, wherein the rear window (H4) is supported and moved by linkage parts (H9; H10) arranged laterally in the automobile body (6).

7. Motor vehicle (1) in accordance with claim 1, wherein to allow adjustment of the released position of the rear window (H4) at least in certain regions, the rear window (H4) can be moved into the automobile body (6) by means of lateral guide rails (H14; H15).

8. Motor vehicle (1) in accordance with claim 1, wherein the rear window (H4) has lateral edges (H13) and a lower edge (H12), and wherein the hatch (H1) has an essentially U-shaped design outside the rear window (H4) and, in its closed position, encloses (H2; H3) the rear window (H4) at least partially at lateral edges (H13) and the lower edge (H12) of the rear window (H4).

9. Motor vehicle (1) in accordance with claim 1, wherein in the closed position of the rear window (H4), at least one additional movable panel section (P1; P2) extends from the upper and forward edge (H5) (in the direction of vehicle travel) of the rear window (H4) and can also be lowered into the automobile body (6).

10. Motor vehicle (1) in accordance with claim 9, wherein the rear window (H4) and the other panel section(s) (P1; P2) lie parallel to one another in the open position.

11. Movable hatch (H1) for a motor vehicle (1) in accordance with claim 1.

* * * * *